Patented Nov. 11, 1924.

1,514,731

UNITED STATES PATENT OFFICE.

RUDOLPH R. ROSENBAUM, OF CHICAGO, ILLINOIS.

PARTING AND CORE COMPOUND.

No Drawing. Application filed December 28, 1923. Serial No. 683,137.

*To all whom it may concern:*

Be it known that I, RUDOLPH R. ROSENBAUM, a citizen of the United States, and a resident of Chicago, in the county of Cook and State of Illinois, have invented certain new and useful Improvements in Parting and Core Compounds, of which the following is a specification.

My invention relates to compounds to be used for parting purposes or in the making of cores for foundry use. Compounds of this class usually comprise a body of fine, porous, and preferably non-hygroscopic material, and a filler or coating to render it impervious to moisture and to prevent it from baking together when heated.

I have found that decolorizing earths and clays, such as fuller's earth and colloidal clays make good bodies for such parting and core compound. Such materials are abundantly used for decolorizing petroleum oils, and for filtering and decolorizing vegetable or animal oils. The materials, after becoming exhausted after a period of filtering and decolorizing use, have been considered as refuse and were thrown away. Now I have found that these exhausted discarded materials form ideal substances for parting purposes and in the making of cores for foundry use, and by utilizing them instead of fresh materials which must be bought at considerable expense, I am enabled to produce parting and core compounds at comparatively very little cost and which can be sold on the market for much less than the compounds now generally used. Take, for example, fuller's earth. Such earth is used abundantly by packers and soap manufacturers for filtering and decolorizing vegetable or animal oils, and the earth which is discarded as refuse still contains a considerable percentage of oil or grease which serves admirably as a filler. I also use petroleum oils or jellies, and animal, vegetable, or mineral waxes for filling purposes. Where the refuse does not have enough filler content, I add a sufficient quantity of any of the above filling substances to bring the filler content to the desired percentage, such filler substance serving to saturate and coat the particles of the body material to make it impervious to moisture and to counteract any hygroscopic properties which the body material may possess.

It is desirable to have the compound, particularly when it is to be used for parting purposes, of a light color, so that it is readily visible when sprinkled on the molds. Fuller's earth or other substances used for filtering and decolorizing purposes may become of dark color from use, but by a simple process of bleaching the color can be made sufficiently light.

The procedure for making the compound is as follows: If the color of the refuse is too dark it is first bleached as by mixing it in a solution of mineral acid such as sulphuric acid, nitric acid, or hydrochloric acid. I can also use glacial acetic acid, or chrome acid, or solutions of sulphurous acid, or compressed liquid sulphurous acid. After such acid treatment, any acid residue is neutralized with ammonia and the material is then heated until dry. The ammonium salts which were formed will be volatilized by the heat and will carry with them carbon particles which were formed by the use of the earth for decolorizing purposes. If, after being bleached and dried, the material is too coarse, it is comminuted by grinding or screening. It is then fed into a heated cylinder together with filler substance preferably in liquid state. As before stated such filler substance may be animal or vegetable fat or oil, or petroleum oil or jelly, or animal, or vegetable or mineral wax, or a mixture of two or more of these substances. The quantity of filler added depends upon the quantity of available filler material already in the fuller's earth or other body material. Usually the filler material constitutes from one and one half per cent to five per cent of the finished compound. In the heated revolving cylinder the body material and filler substances are thoroughly mixed, roasted and dried, and baffle walls in the cylinder serve to keep the mixture well separated or in powder form. Within the cylinder screens may be placed of gradually increasing mesh through which the mixture must travel after it is thoroughly dried, and it is finally passed through bolting material which will give it the desired fineness.

During travel through the cylinder the particles of the body material are thoroughly filled and coated with the oleaginous substance, and the finished product will therefore be impervious to moisture and will not bake together.

If the refuse has already sufficient filler and coating substance therein the only treatment required will be drying and comminuting, and in some cases a preliminary bleaching treatment.

It will thus be seen that I have transformed into a highly useful commercial product, materials which have been heretofore discarded as refuse and useless, and such transformation is accomplished at very small expense.

I claim as follows:

1. A compound of the class described, consisting of a comminuted decolorizing earth, and a moisture proofing filler and coating substance incorporated therewith.

2. A compound of the class described, consisting of body material in the form of a decolorizing clay, and a moisture proofing filler and coating substance for said material.

3. A compound of the class described consisting of comminuted fuller's earth impregnated with moisture proofing substance.

4. A parting or core compound consisting of comminuted fuller's earth impregnated with oleaginous substance.

5. A parting or core compound consisting of refuse decolorizing earth comminuted and dried, and filler and coating substance incorporated therein.

6. A compound of the class described consisting of a decolorizing earth or clay which has become exhausted by use for decolorizing or filtering purposes, and moisture proofing filler and coating substance incorporated therewith.

7. As an ingredient for parting and core compound, a decolorizing earth or clay after it has been ground and dried subsequent to its use for filtering or decolorization purposes.

8. As an ingredient for parting and core compound, comminuted and dried refuse decolorizing or filtering earth or clay.

9. As an ingredient for parting and core compound, comminuted and dried refuse fuller's earth.

10. As an ingredient for parting and core compound, refuse fuller's earth which has been used for decolorizing or filtering animal or vegetable oils.

11. An ingredient for parting and core compound in the form of fuller's earth which has been exhausted in use as a filtering or decolorizing agent for oleaginous products.

12. In the manufacture of parting or core compound, the use of fuller's earth discarded after being used for filtration or decolorizing purposes.

13. In the manufacture of parting or core compound, the use of fuller's earth discarded after serving for filtering or decolorizing oleaginous substance.

14. An ingredient for parting and core compound in the form of fuller's earth refuse of filtering and decolorizing processes, said earth having been comminuted and dried.

15. An ingredient for parting and core compound in the form of fuller's earth refuse which has been bleached, comminuted and dried.

16. The process of making parting or core compound which consists in comminuting and drying the refuse fuller's earth of oil filtration and decolorizing processes, and adding to the comminuted and dried earth a sufficient amount of filler and coating substance to make such material impervious to moisture.

17. The process of making parting and core compound which consists in bleaching, drying and comminuting the fuller's earth refuse of oleaginous substance filtering and decolorizing processes, and supplying such treated refuse with oleaginous substance in addition to that retained by the earth to an amount sufficient to cause such earth to be made impervious to moisture.

18. The process of preparing for use in parting and core compounds the fuller's earth refuse of decolorizing processes which consists in bleaching the earth and then drying and comminuting it.

19. The process of bleaching the fuller's earth refuse of decolorizing processes which consists in subjecting it to acid treatment, then neutralizing the residue acid with ammonia, and then drying and burning off the ammonium salts which were formed.

In witness whereof, I hereunto subscribe my name this 22 day of December, 1923.

RUDOLPH R. ROSENBAUM.